United States Patent

[11] 3,589,464

| [72] | Inventor | Atanas S. Katchamakoff<br>8530 Louise Ave., Northridge, Calif. 91234 |
|---|---|---|
| [21] | Appl. No. | 783,363 |
| [22] | Filed | Dec. 12, 1968 |
| [45] | Patented | June 29, 1971 |

[54] SPRING-POWERED MECHANISMS
7 Claims, 9 Drawing Figs.

[52] U.S. Cl. .................................................. 180/54,
105/71, 185/10, 185/39
[51] Int. Cl. ........................................................ B60k 9/02
[50] Field of Search ............................................. 180/54, 1;
185/37, 38, 39, 45, 40, 43, 44, 9, 10, 11, 12, 13;
105/67, 68, 69, 70, 71, 72; 46/206, 208, 78; 58/46, 86

[56] References Cited
UNITED STATES PATENTS

| 619,058 | 2/1899 | Von Hohenstein | 185/37 40 F |
|---|---|---|---|
| 1,125,337 | 1/1915 | Jorgensen | 185/45 X |
| 1,258,158 | 3/1918 | Sims | 185/37 40 H |
| 1,721,807 | 7/1929 | Eisiminger et al. | 185/37 40 H |

FOREIGN PATENTS

| 453,526 | 9/1936 | Great Britain | 180/54 |
|---|---|---|---|

Primary Examiner—Kenneth H. Betts
Assistant Examiner—Milton L. Smith
Attorney—Whann & McManigal ABSTRACT: A spring-containing power cartridge for use in powering various mechanisms, including vehicles, equipped to receive one or more such cartridges and utilize the same as a replaceable power source.

PATENTED JUN29 1971  3,589,464

INVENTOR.
ATANAS S. KATCHAMAKOFF
BY
Mason V Graham
ATTORNEYS

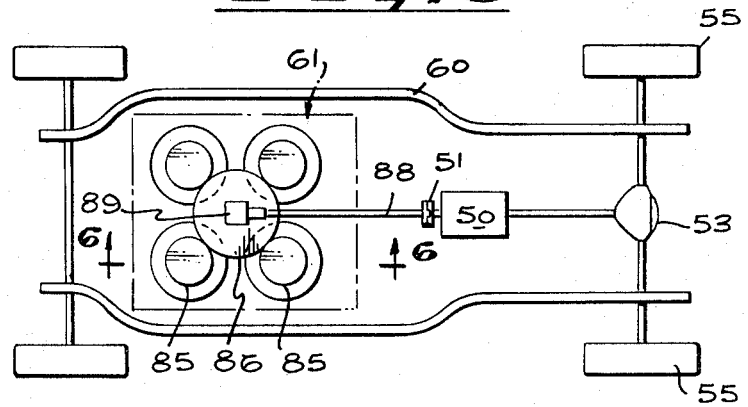
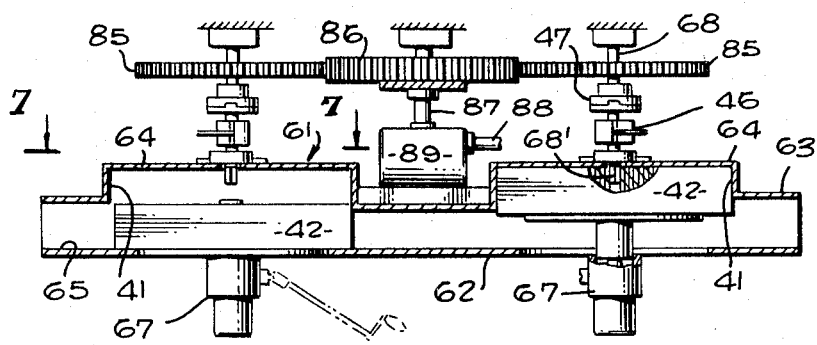
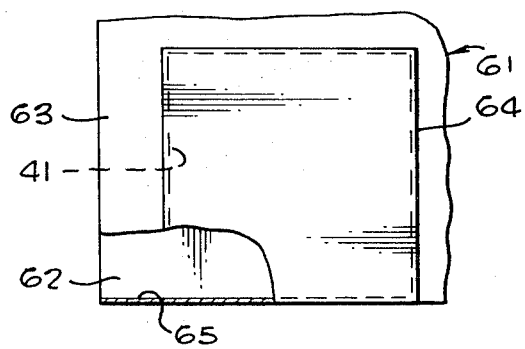
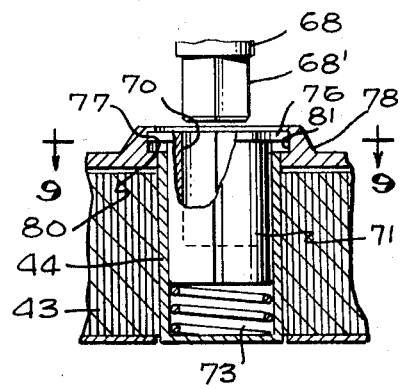
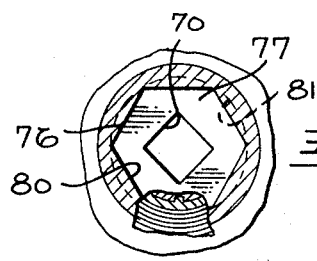

SPRING-POWERED MECHANISMS

The invention has to do generally with spring-powered devices including stationary mechanisms, portable tools and appliances, and vehicles and more particularly with a device or mechanism adapted to accommodate and releasably mount one or more spring-containing power cartridges and utilize the same as a source of power.

Although heretofore springs have been widely used as motive power in connection with appliances, tools, and vehicles, so far as known, the springs have been built into the device, apparatus or vehicle they power, making it necessary to rewind the spring in place. While this is feasible for mechanisms requiring only small, easily wound springs, it is impracticable for mechanisms requiring large, heavy-duty springs, such as might be used for powering vehicles, since it would result in disabling the mechanism until the springs can be rewound by motorized means or by manually operable means having a high mechanical advantage.

Therefore, a general object of the invention is to provide novel apparatus, utilizing a removable or replaceable power cartridge containing a spring for furnishing the power required.

Another object is to provide a novel mechanical system or mechanism for utilizing a plurality of replaceable spring power cartridges.

A further object is to provide a novel drive assembly for a spring-driven vehicle adapted to utilize replaceable spring power cartridges.

In summation, therefore, it is an object to provide apparatus based on the concept of utilizing spring power mechanisms wherein the spring power is furnished in the form of cartridges which can be readily detachably mounted in the mechanism to be driven, thereby affording the means for enabling ready replacements.

These and other objects will be apparent from the drawings and the following description. Referring to the drawings:

FIG. 5 is a diagrammatic plan view of the application of the invention to a vehicle;

FIG. 6 is a fragmentary sectional view on line 6-6 of FIG. 5, but on a larger scale;

FIG. 7 is a fragmentary sectional plan view on line 7-7 of FIG. 6;

FIG. 8 is a fragmentary sectional view through the central portion of a cartridge; and FIG. 9 is a fragmentary sectional view on line 9-9 of FIG. 8.

Figure 1:
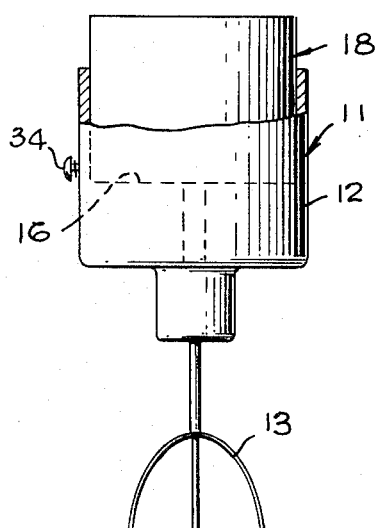
FIG. 1 is an elevational view, partly broken away, of an appliance embodying a simple form of the invention.
Figure 2:
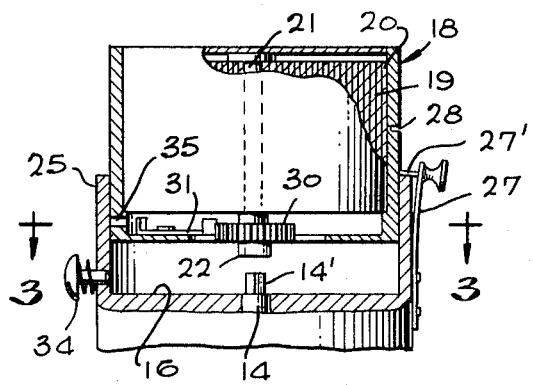
FIG. 2 is a fragmentary sectional view of the upper portion of FIG. 1, partly broken away, but on a larger scale.
Figure 3:
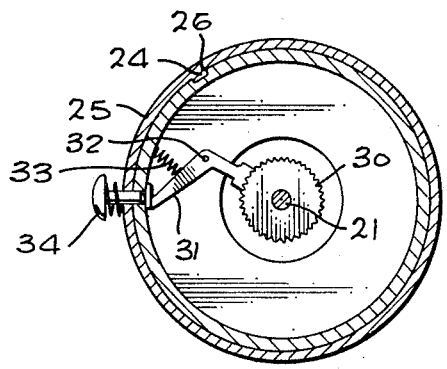
FIG. 3 is a cross-sectional view on line 3-3 of FIG. 2.

More particularly describing the invention, in FIGS. 1-3 I show a simple version of the invention as applied to a portable appliance or tool 11 shown as an egg beater or mixer having a body 12 from which a rotatable implement 13 extends. The body may be provided internally with a drive train of any conventional type which may include gear reduction means or the like, but since the nature of such drive train is unimportant to the invention, it is not shown except for the power input end thereof which comprises a shaft 14 having a noncircular end portion 14'.

The body 12 is formed with a cylindrical cavity or well 16 to receive a cylindrical power cartridge 18 containing a spirally wound spring 19.

It is a particular feature of the invention that I provide replaceable cartridges embodying spring power units as the power source for driving various types of mechanisms and thus, in the particular one shown the cartridge 18 comprises a casing 20 within which is the spirally wound spring 19, the outer turn of which is attached to the casing by any suitable means (not shown), and the inner turn of which is attached by other suitable means (not shown) to a rotatable central shaft 21. The end of the shaft is provided with a socket 22 shaped internally to receive but prevent relative rotation of the noncircular end 14' of shaft 14 of the appliance when the power cartridge is slipped into the body.

In order to prevent relative rotation of the cartridge 18 and the body of the appliance, a longitudinal rib 24 (FIG. 3) is provided on the wall 25 of the body inside the well 16 for reception in a groove 26 in the power cartridge. A latch, consisting of a spring finger 27 mounted on the body and having an end portion 27' which is received in a recess 28 in the wall 20 of the cartridge, serves to releasably anchor the cartridge in place.

The cartridge 18 contains means for preventing premature unwinding of the spring and this has been shown as a gear wheel 30 on shaft 21 which is normally engaged and held against rotation by a pawl 31 pivotally mounted at 32. The pawl is releasably held in engagement with the gear wheel by a tension spring 33. The pawl is moved to release position by a manually operable button 34 carried on the body and movable through a registering hole 35 in the wall of the cartridge. It will be apparent that the power cartridge 18 may be readily inserted in the body 12 of the mixer and used as desired and equally easily removed for rewinding or replacement by another cartridge.

While in its broader aspects the invention embraces the idea of replaceable power spring units for operating any mechanism, in FIGS. 4—9 the invention is shown applied to a vehicle with the concept that the vehicle would be equipped with a plurality of spring power units or cartridges and that these may be replaced at what might be termed rewinding stations along the route, much as present day motor vehicles are refueled at gasoline stations.

Figure 4:
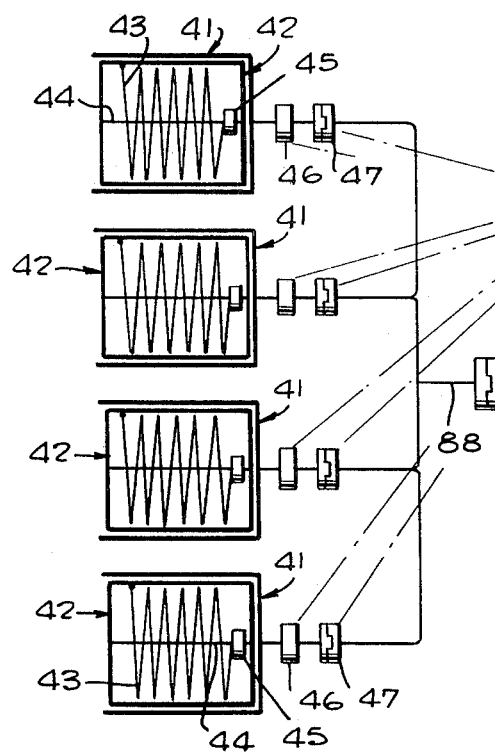
FIG 4 is a diagrammatic view showing the application of the invention to the drive train of a vehicle.
Figure 4:
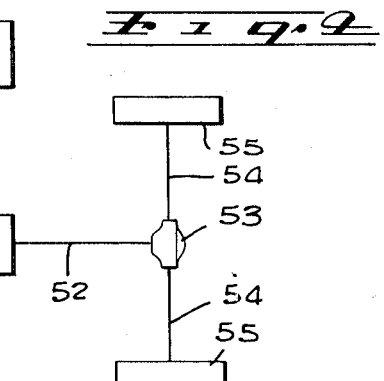

Referring now to FIG. 4 which diagrammatically shows drive train means for a vehicle, the numeral 41 designates a plurality of receptacles or receivers forming part of the vehicle, each of which would releasably mount a spring power cartridge 42. Each cartridge would have a power spring 43 connected at its outer end to the casing of the cartridge and connected at its inner end to a shaft 44. Each cartridge would also embody means for preventing unwinding of the spring and such means has been indicated by numeral 45. Preferably this means would be disengaged automatically by the mounting of the spring cartridge in its receptacle, and the drive train of the vehicle itself would be provided with a means 46, which may be in the form of a brake, for preventing unwinding of the spring of that particular cartridge except when the power of the spring is required.

Preferably an auxiliary clutch 47 should be provided between each power unit and the remainder of the drive train of the vehicle, so that the individual power units can be isolated from the drive train. The drive train of the vehicle may include a suitable transmission 50 with a main clutch 51 between it and the auxiliary clutches 47. Conventional drive shaft 52, differential gear means 53 and axle shafts 54 deliver power to the wheels 55. In FIG. 4 a control means 58 has been shown for controlling the various elements of the system and this can take any conventional form, either mechanical, or a servomechanism type, the broken lines designating the elements controlled.

Referring now to FIGS. 5—9, which show somewhat more in detail the structure which may be used, the vehicle chassis, designated 60, is provided with a housing structure 61 having a lower wall 62 and an upper wall 63. The latter is formed to provide upwardly projecting rectangular portions 64 forming the downwardly opening receptacles 41 for mounting the spring power cartridges 42. These may be inserted laterally through open areas 65 until in registration with the receptacles, as indicated in FIG. 6, and then raised into place and held there, as by a jackscrew 67, or other suitable means. As the power unit is raised into position it engages the noncircular end portion 68' of a shaft 68 of the drive train of the vehicle, and, by way of example, end portion 68 may be received in a socket 70 in an axially movable member 71, which is in turn received within a tubular shaft 44 and normally urged to the position shown by a spring 73. The parts 71 and 44 are keyed against relative rotation. The power spring 43 is wound around shaft 44 being secured to it at one end and to the casing at the other end.

With the parts in the position of FIG. 8 the spring 43 is locked against unwinding by the noncircular periphery 76 of a flange 77 on member 71 which is received within a keeper 78 having an internal surface 80 shaped correspondingly to the outer surface 76 of the flange. However, when the parts are coupled by raising the cartridge into place, the shaft 72 is pushed inwardly against spring 73 moving flange 77 down into and opposite a circular area 81 allowing the shaft 72 to turn and the spring to unwind provided it is not restrained by the brake 46.

By way of further showing the actual construction, but yet somewhat diagrammatic, the brake 46 and auxiliary clutch 47 of each unit is mounted above the housing 61 and the shaft 68 is fitted with a gear wheel 85 which meshes with a central gear 86 which is driven by all of the units and in turn drives the shafts 87 and 88 through bevel gears (not shown) in case 89.

With the arrangement shown and described it will be apparent that any one or multiple of the power cartridges can be used at any one time to power the vehicle. Also, when coasting downhill, springs may be rewound by utilizing reverse gearing of the transmission and each power cartridge may incorporate means in the nature of torque limiting means to prevent overwind.

It will also be apparent that the spring power cartridges, when spent, or nearly so, may be replaced, as at a rewind station along the road, or at any available source.

I claim:

1. In a vehicle having a chassis and wheels, means for driving at least one of the wheels, comprising a plurality of power cartridges each containing a coiled drive spring, a plurality of cartridge receptacles on the chassis, interengaging means on said cartridges and receptacles for releasably securing said cartridges in said receptacles, releasable means in each cartridge for preventing the spring from unwinding, means carried by the vehicle for releasing said last-mentioned means, a transmission carried by said chassis, means operatively connecting the transmission to at least one of said wheels, drive means connecting each spring with said transmission including a main clutch and means for preventing unwinding of each spring located between said main clutch and the spring, and means carried by the vehicle for operating said clutch and said last-mentioned means for preventing unwinding of the spring.

2. The vehicle set forth in claim 1, in which there is an auxiliary clutch between each spring and said main clutch.

3. In combination, a device adapted to be powered having a drive train and a driven element at the outer end of the drive train and means carried by said device forming a power unit receptacle; a power unit receivable in said receptacle and including a casing, a coil spring therein, and means releasably holding the spring against unwinding; interengaging means on said power unit and said device for releasably locking the same together; and means for coupling said spring to said drive train.

4. The combination set forth in claim 3, in which said device is provided with means for releasing the means holding the spring against unwinding.

5. In a vehicle having a chassis provided with a plurality of wheels, means for driving at least one of the wheels, comprising a power cartridge containing a coiled drive spring and having means for releasably locking said spring against uncoiling, a cartridge receptacle carried by the chassis, means carried by the chassis for releasably securing said cartridge in the receptacle, a drive train carried by said chassis operatively connected at one end to at least one of said wheels and terminating at its other end at said receptacle, means for coupling the spring in said cartridge to said drive train, and means carried by said chassis for releasing the means releasably locking the spring against uncoiling.

6. In a vehicle having a chassis provided with a plurality of wheels, means for driving at least one of the wheels, comprising a plurality of cartridge receptacles carried by the chassis, a power cartridge containing a coiled drive spring in each receptacle, means for releasably securing said cartridges in the receptacles, a drive train in the vehicle operatively connected at one end to at least one of said wheels and extending to said receptacles, means for coupling the springs in said cartridges to said drive train, and an auxiliary clutch between said drive train and each of said springs.

7. The vehicle set forth in claim 6, in which releasable means is provided between each auxiliary clutch and the power cartridge associated therewith for preventing the spring in the cartridge from unwinding.